March 1, 1932.  M. W. GILDEN  1,848,007
WHEEL RACK
Filed March 2, 1931
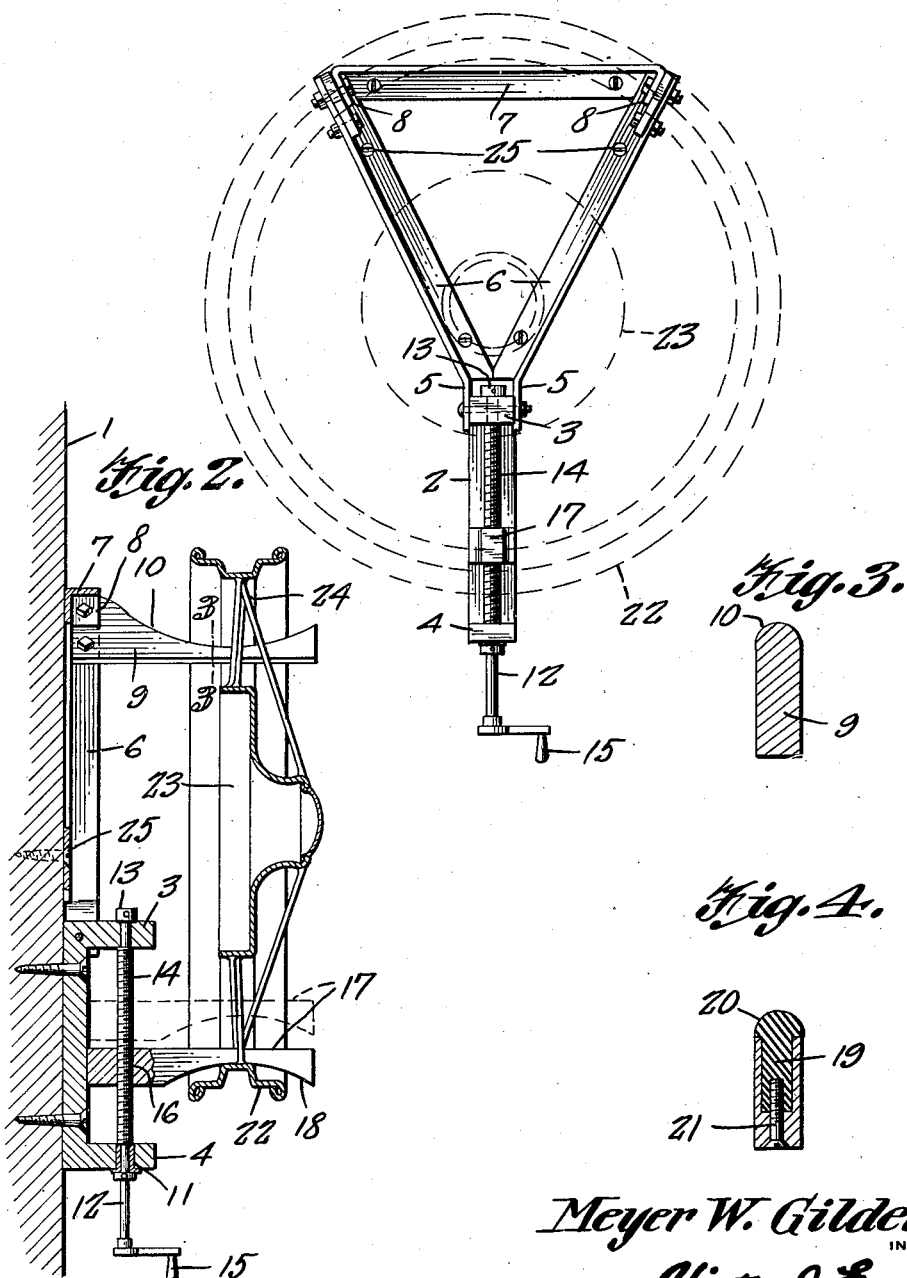
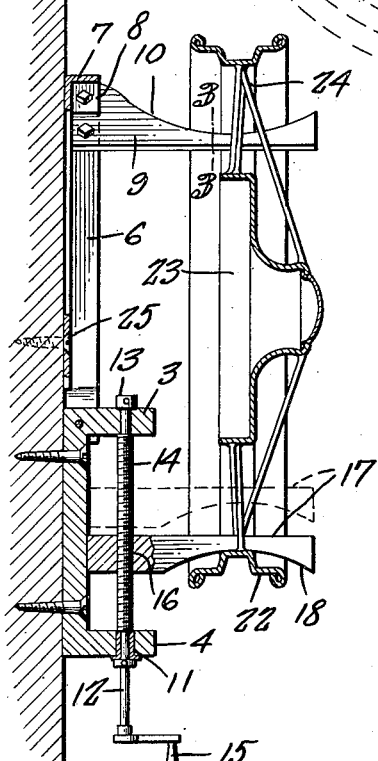
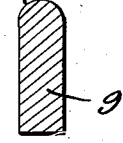
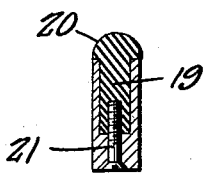
Meyer W. Gilden,
INVENTOR
BY Victor J. Evans
and Co. ATTORNEYS
WITNESS: P. J. Hickey Patented Mar. 1, 1932                                                    1,848,007

UNITED STATES PATENT OFFICE

MEYER W. GILDEN, OF ANNAPOLIS, MARYLAND

WHEEL RACK

Application filed March 2, 1931. Serial No. 519,638.

My present invention has reference to a wheel support or rack especially designed for use in garages or automobile repair shops, and the primary object of the invention is the provision of a device for this purpose that is provided with spaced and angularly arranged arms which are adjusted with respect to each other and which are designed to be passed between the spokes and to contact with the inner drop portion of tire carrying rims of a wheel so that the tire may be readily arranged on or removed from the wheel and also whereby repairs may be made in a convenient manner to the wheel.

To the attainment of the foregoing and many other objects which will present themselves as the nature of the invention is better understood, the improvement consists in the invention hereinafter described and definitely claimed.

In the drawings:

Figure 1 is a front elevation of the improvement.

Figure 2 is a side elevation with parts in section, the wheel engaged by the improvement being also in section.

Figure 3 is a sectional view approximately on the line 3—3 of Figure 2.

Figure 4 is a similar sectional view but showing the arm provided with a pocket for a compressible member.

My improvement is designed to be bolted to a post or to the upright 1 in an automobile repair shop, garage or the like. The improvement essentially includes a plate or bar 2 that has both its upper and its lower ends offset or extended right angularly in the same direction, as indicated by the numerals 3 and 4. The plate 2 is comparatively thick as are the ends of the arms 3 and 4 thereof and the said plate, at the upper portion thereof, has its sides contacted by the straight and parallel side flanges 5 at the meeting ends of angle plates 6, respectively. The plates 6 are disposed at opposite angles with respect to each other, or in other words, the angle plates from the body plate 2 is provided with an upper Y-shaped extension. The upper and spread ends of the angle plates 6 are connected together and held in proper spaced relation by an angle plate 7. Between the inturned flanges 8 at the ends of the angle plate 7 and the side or outstanding flanges of the plates 6 there are bolted the inner and widened ends of arms 9. Each of the arms has its outer face concaved or rounded inwardly, as at 10.

The arms 3 and 4 of the body plate 2 are provided with alining round openings, and in the opening of the arm 4 there is arranged a flanged bushing 11. There is passed through this bushing and through the opening in the upper arm 3 the reduced and nonthreaded ends of a shaft 12. A head 13 is secured on the upper end of the shaft and rests on the arm 3, and the portion of the shaft between the arms 3 and 4 is thickened and is threaded, as at 14. The threaded portion of the shaft is, of course, round in cross section. The lower end of the shaft has attached thereto a crank handle 15 and the threaded portion 14 of the shaft passes through a threaded opening 16 of an outwardly extending arm 17, and the inner and widened end of the arm being in direct contact with the outer face of the body plate 2. The outer or lower face of the arm 17 is concaved, as at 18.

If desired all of the arms may have their outer and concaved faces channeled to provide pockets for compressible members 19 whose rounded headed portions 20 extend a suitable distance beyond the edges of the arms and whose bodies are held in the pockets by screw or like elements 21.

The improvement is primarily designed for employment in connection with the drop center rims 22 of wire spoke wheels 23, the arms 10 and 17 being arranged between the spokes of the wheel and their rounded or concaved faces brought into contact with the central drop portion 24 of the wheel 23. By turning the handle 15 the shaft will be likewise turned, causing the screw or threaded portion 14 thereof to impart a vertical movement in either direction to the arm 17 so that the device may be employed with equal efficiency upon drop center wheels of different sizes. When engaged by the arms the wheel is held in a firm and steady position so that a tire may be applied to or removed from the wheel and likewise should it be found necessary, repairs may be made to the wheel.

It is to be noted that the plates 6 and 7 have passed therethrough securing elements, such as screws 25, which enter the post or supporting surface 1, so that the device is rigidly secured on such surface.

The improvement is of a simple nature and its advantages will, it is thought, be understood and appreciated by those skilled in the art to which the invention relates but obviously I do not wish to be restricted to the precise details herein set forth and therefore, hold myself entitled to make such changes therefrom as fairly fall within the scope of what I claim.

Having described the invention, I claim:

A wheel rack comprising a plate having angularly disposed end portions, a shaft journaled in the end portions of said plate and having an external thread, arms attached to the plate, an arm threaded upon the shaft and guided for movement with relation to the first-mentioned arms and parallel thereto, the outer edge portions of said arms being concave to form pockets.

In testimony whereof I affix my signature.

MEYER W. GILDEN.